United States Patent [19]

Dickinson

[11] 4,339,857
[45] Jul. 20, 1982

[54] INTEGRATED CYLINDER FINISHING SYSTEM

[76] Inventor: Lawrence C. Dickinson, 2255 Eva Adams, Reno, Nev. 89504

[21] Appl. No.: 176,941

[22] Filed: Aug. 11, 1980

[51] Int. Cl.³ .................... B23B 41/16; B23B 47/34
[52] U.S. Cl. ............................ 29/26 A; 29/33 T;
82/1.2; 82/34 R; 408/67; 409/137
[58] Field of Search ........... 29/33 T, 26 A, DIG. 94,
29/DIG. 53, DIG. 102; 409/137; 408/67, 68;
82/2 R, 34 R, 1.2, 1.3, 1.4, 1.5

[56] References Cited

U.S. PATENT DOCUMENTS

| | | | |
|---|---|---|---|
| 2,199,652 | 5/1940 | Schuhmacher | 408/67 |
| 3,455,190 | 7/1969 | Dalik | 408/67 X |
| 3,478,377 | 11/1969 | Stoker | 408/67 |
| 4,223,577 | 9/1980 | Seppelt | 82/1.5 X |
| 4,259,884 | 4/1981 | Hartkopf et al. | 82/1.5 |

FOREIGN PATENT DOCUMENTS 716780  2/1980  U.S.S.R. .................. 408/68

*Primary Examiner*—William R. Briggs
*Attorney, Agent, or Firm*—Townsend and Townsend

[57] ABSTRACT

A system for finishing the cylindrical interior of a workpiece on a single machine is disclosed. The workpiece is mounted to allow access to its cylindrical interior from each end. A skiving tool is advanced into and through the cylindrical interior of the workpiece from one end to machine the cylindrical interior. As the skiving tool is operating, cutting oil is introduced into the cylindrical interior of the workpiece to entrain the chips generated by the skiving tool and flush the chips out through the second end of the workpiece. The cutting oil and entrained chips are deflected at the second end of the workpiece into a collector during operation of the skiving tool. The deflector is moveable to expose the second end of the workpiece when operation of the skiving tool is completed. A honing tool is advanced into and through the cylindrical interior of the workpiece from the second end thereof after the deflector has been moved and skiving completed. The honing tool removes imperfections in the cylindrical interior of the workpiece which had resulted from use of the skiving tool.

14 Claims, 4 Drawing Figures

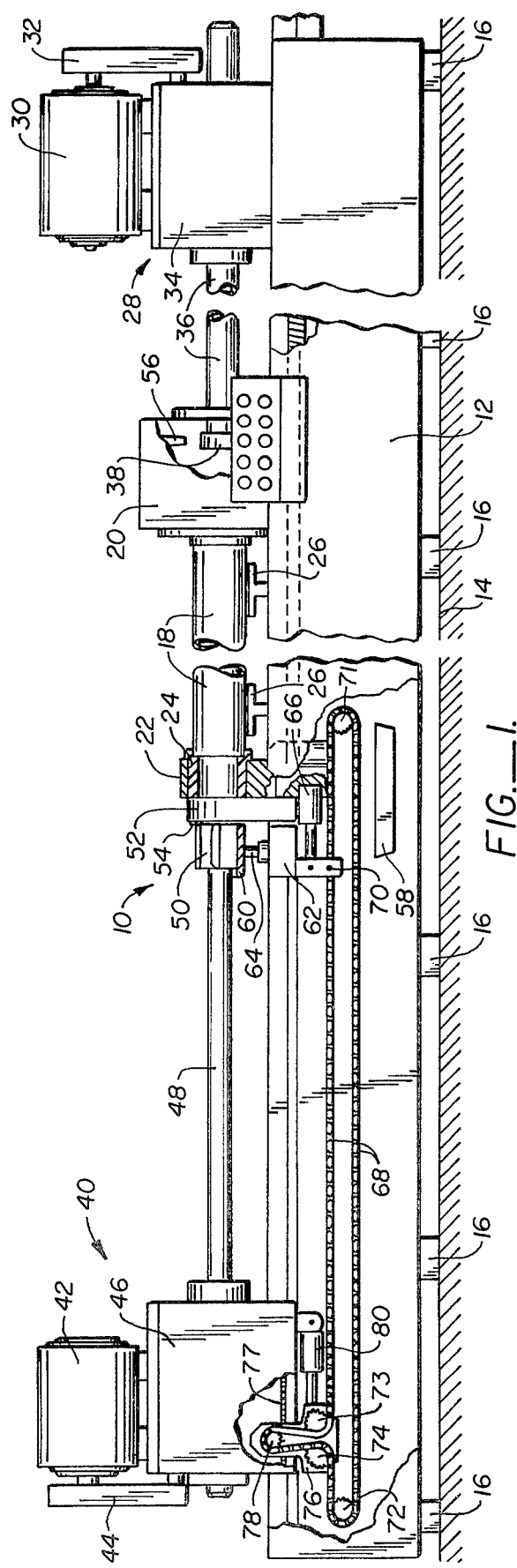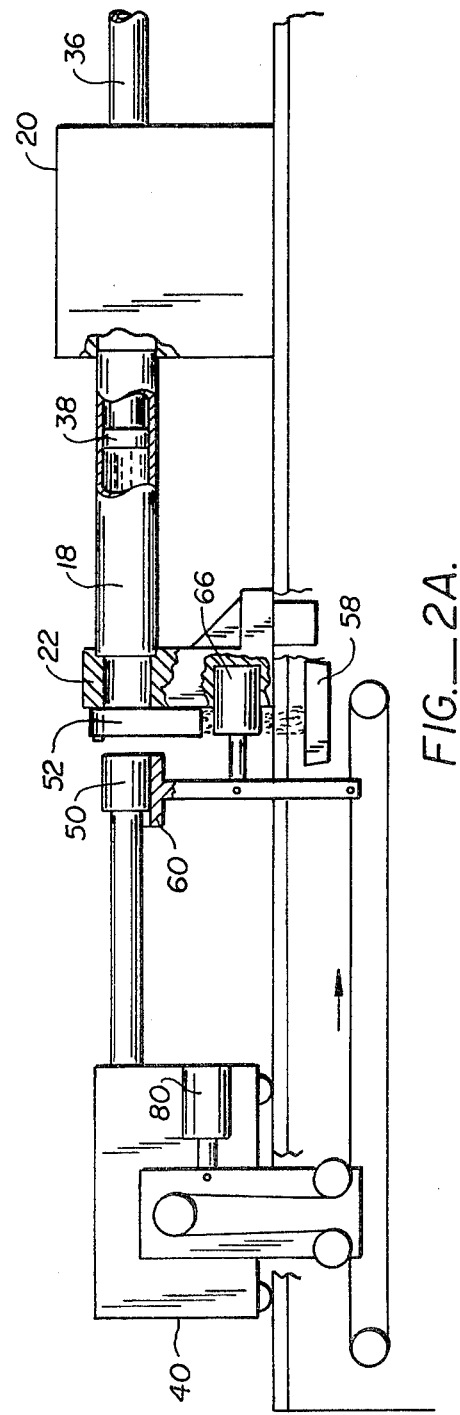
FIG._1.
FIG._2A.

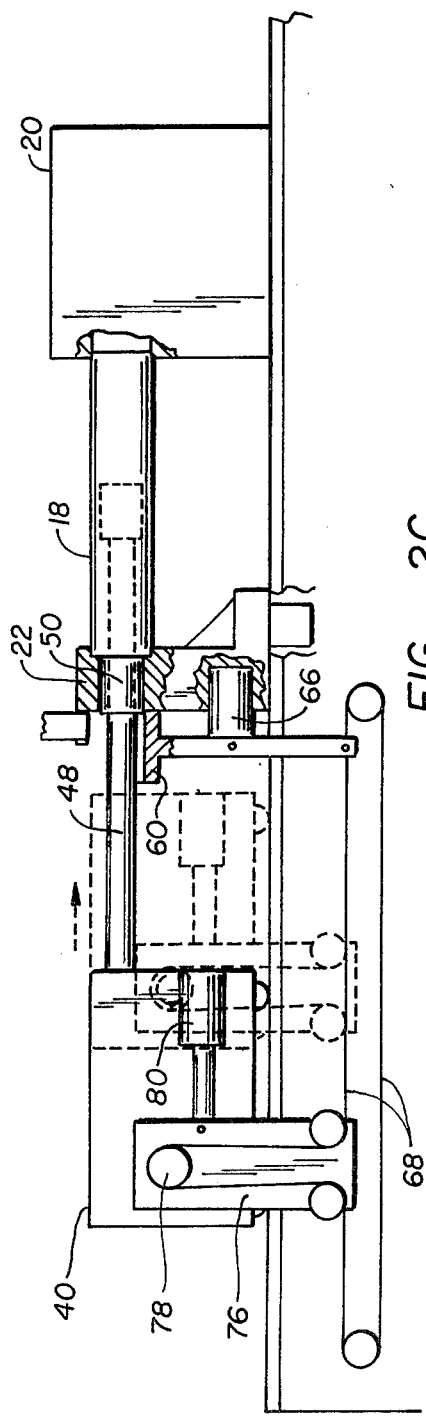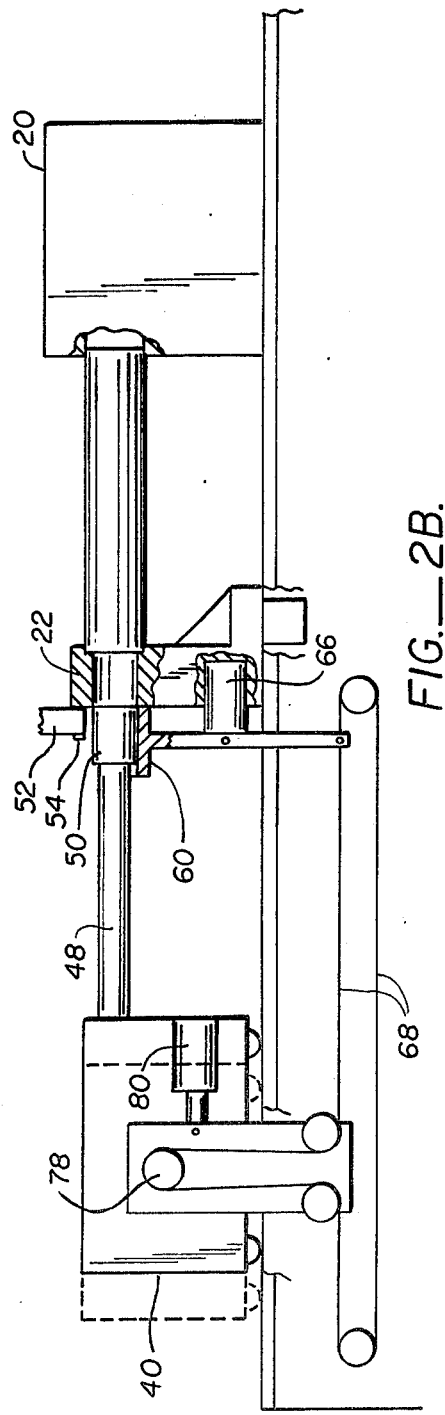

INTEGRATED CYLINDER FINISHING SYSTEM

BACKGROUND OF THE INVENTION

The present invention relates to an integrated system for finishing the cylindrical interior of a workpiece such as a hydraulic cylinder.

A hydraulic or pneumatic cylinder is typically roughly formed in a steel mill by drawing a steel blank over a mandrel. As the steel is drawn over the mandrel, particulate matter often becomes embedded in the interior surfaces of the cylinder, and imperfections in the mandrel form corresponding imperfections on the interior of the cylinder. As a result, the interior surfaces of the cylinder must be finished so that the cylinder is usable for hydraulic or pneumatic applications.

Perhaps the most common technique for finishing the interior surface of the cylinder is to hone the cylinder until smooth. This technique for finishing the interior of the cylinder is relatively inefficient because a hone is primarily designed to remove relatively small amounts of material so that the surface becomes quite smooth.

A relatively large amount of time and effort is required to remove the rather substantial imperfections initially present in the cylinder blank. A far more efficient technique would be to initially cut the interior of the cylinder to its approximate final dimensions, before smoothing the interior surface with a honing tool.

A technique has recently been developed for finishing the interior surfaces of a cylinder on a single machine. A skiving and roller burnishing tool, such as those shown in U.S. Pat. Nos. 3,795,957 and 4,133,089, finishes the interior of the cylinder in a single step. The skiving portion of the tool machines the interior of the cylinder, and the roller burnishing portion smoothes out the imperfections of the machining.

This latter technique has the advantage of finishing the interior of the cylinder in a single operation, but has been found to have certain drawbacks. The roller burnishing forms a surface on the interior of the cylinder which is actually too smooth in most applications. The slight cross hatching provided by a honing tool in the conventional system is useful to allow oil to permeate the sidewalls of the cylinder, and the smooth walls formed by roller burnishing cannot provide this feature. As a result, the oil does not reach the seals, causing them to wear prematurely. In addition, roller burnishing compresses the material, which can cause laminations subject to potential delamination. Also, the combined skiving and roller burnishing tool required is relatively expensive and subject to failure.

SUMMARY OF THE INVENTION

The present invention provides a system for finishing the cylindrical interior of a workpiece on a single machine. The workpiece is mounted to allow access to its cylinderical interior from each end. A skiving tool is advanced into and through the cylindrical interior of the workpiece from one end to machine the cylindrical interior. As the skiving tool is operating, cutting oil is introduced into the cylindrical interior of the workpiece to entrain the chips generated by the skiving tool and flush the chips out through the second end of the workpiece. The cutting oil and entrained chips are deflected at the second end of the workpiece into a collector during operation of the skiving tool. The deflector is moveable to expose the second end of the workpiece when operation of the skiving tool is completed. A finishing tool such as a honing tool is advanced into and through the cylindrical interior of the workpiece from the second end thereof after the deflector has been moved and skiving completed. The honing tool removes imperfections in the cylindrical interior of the workpiece which had resulted from use of the skiving tool.

The present invention thus allows a complete finishing of the interior of a cylinder, including separate skiving and honing steps, in a single setup. Skiving and honing steps are performed from opposite ends of the workpiece. During the skiving step, the deflector controls the flow of cutting oil so that it does not reach the honing tool. However, the deflector can be moved so that the honing step can readily be performed after completion of the skiving step.

It is preferred that the honing tool be supported on a hone rest during operation of the skiving tool. After skiving has been completed, the hone rest, honing tool and hone drive are moved in unison so that the honing tool is advanced to a position proximate the tailstock supporting the second end of the workpiece. The hone drive and honing tool are then advanced in unison to move the honing tool from the hone rest into the tailstock. A chain then advances the hone drive to move the honing tool through the cylindrical interior of the workpiece. In this fashion, honing can readily be accomplished after the deflector has been moved out of the way to expose the second end of the cylinder.

The novel features which are characteristic of the invention, as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention. description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a side elevation view of the preferred embodiment of the present invention with portions cut away;

FIGS. 2A–C are a sequence of schematic views illustrating the operation of the embodiment of FIG. 1.

DESCRIPTION OF THE PREFERRED EMBODIMENT

The apparatus 10 of the preferred embodiment of the present invention is illustrated generally by way of reference to FIG. 1. A unitary machine bed 12 is mounted on a supporting floor 14 by posts 16. All components of the preferred embodiment are mounted on machine bed 12.

A workpiece 18 having a hollow cylindrical interior, typically a hydraulic or pneumatic cylinder blank, is mounted on machine bed 12. A headstock 20 attaches to one end of cylinder 18, and a tailstock 22 attaches to the other end. Headstock 20 and tailstock 22 may include shims 24 to adapt to different size cylinders, as indicated in connection with the tailstock. For large pieces, supporting members 26 may be used to provide further support for the cylinder.

A skiving drive 28 is located at one end of machine bed 12. Skiving drive 28 includes a motor 30 having a belt output 32 connected to gear train in housing 34. A skiving tool shaft 36 emanates from gear housing 34, and has a skiving tool 38 mounted on the end of the tool shaft toward cylinder 18. Headstock 20 has a hollow interior allowing skiving tool 38 to enter the cylinder 18 through the headstock.

A hone drive 40 is located on the end of machine bed 12 opposite from skiving drive 28. Hone drive 40 also includes a motor 42 having a belt output 44 coupled to a gear train in housing 46. A honing tool shaft 48 emanates from gear housing 46, and supports a honing tool 50 disposed a short distance from tailstock 22.

A deflector shield 52 is pivotally mounted to tailstock 22 by pin 54. During operation of skiving tool 38, cutting oil is introduced into the interior of cylinder 18 through a passage 56 in headstock 20. The cutting oil flows through the interior of cylinder 18 and flushes the chips formed by the operation of skiving tool 38 out through tailstock 22. The cutting oil and entrained chips are deflected by deflector shield 52 into a collector 58 during the skiving operation. During the honing operation, as will be illustrated in more detail hereinafter, shield 52 is pivoted about pin connection 54 so that honing tool 50 can penetrate cylinder 18.

When not in use, honing tool 50 is supported by a hone rest 60. Hone rest 60 is mounted on a stand 62 by means of an adjustable support 64 to accommodate different size honing tools. A hydraulic cylinder 66 is adapted to provide transverse movement of hone rest 60.

An endless chain 68 is attached to stand 62 by a pin 70. Chain 68 traverses a pair of idler sprockets 71, 72 mounted to machine bed 12. In addition, chain 68 traverses a pair of idler sprockets 73, 74 mounted on a frame 76 which rides on rails 77 in gear housing 46. A drive pulley 78 engages chain 68 and is driven by a motor (not shown) within gear housing 46. A hydraulic cylinder 80 couples frame 76 to gear housing 46 so that the gear housing can be moved transversely relative to the frame.

The operation of the system of the present invention is illustrated by way of reference to the schematic views of FIGS. 2A-C in sequence.

Referring initially to FIG. 2A, the skiving tool 38 on shaft 36 is advanced into the cylindrical interior of cylinder 18. Shaft 36 rotates so that skiving tool 38 machines the interior of cylinder 18 as it passes through the cylinder. The chips caused by the machining of cylinder 18 are entrained in cutting oil flowing through the interior of the cylinder and out through tailstock 22. The cutting oil and entrained chips are deflected downwardly by shield 52 into collector 58.

During the skiving operation, as depicted in FIG. 2A, honing tool 50 is located on hone rest 60 a distance away from the remainder of tailstock 22 so that shield 52 can be in its downward position. Hone rest 60 is maintained in this position by hydraulic cylinder 66, which is in its extended configuration. Hydraulic cylinder 80 is in its contracted configuration during the skiving operation.

After the skiving operation has been completed, deflector shield 52 is pivoted up and out of the way about pin 54, as depicted in FIG. 2B. Hydraulic cylinder 66 is contracted so that hone rest 60 is moved to a position proximate the remainder of tailstock 22. The motor driving sprocket 78 does not move so that chain 68 and frame 76 serve as a rigid member. Hydraulic cylinder 80 remains in its contracted configuration, and accordingly, hone drive 40, shaft 48 and honing tool 50 move as a unit together with hone rest 60 so that the entire honing system is advanced toward tailstock 22.

After advancement of honing tool 50 and hone rest 60 to a position proximate tailstock 22, hydraulic cylinder 80 is extended as depicted in FIG. 2C. While hydraulic cylinder 80 is being extended, the motor controlling drive sprocket 78 does not move, and accordingly, chain 68 and frame 76 again act as a rigid member. Hone drive 40 is thus advanced another discrete step toward workpiece 18, while hone rest 60 remains stationary. As a result, honing tool 50 is moved off of hone rest 60, and penetrates the interior of tailstock 22.

After hone head 50 has been moved into the interior of tailstock 22, the motor controlling drive sprocket 78 is actuated to move the honing tool into the interior of cylinder 18, as illustrated by dash lines. At the same time, motor 42 (see FIG. 1) is actuated to rotate honing tool shaft 48, and the honing tool is advanced through cylinder 18 with a rotary motion to hone the interior of the cylinder.

The sequence of steps illustrated hereinabove completely finishes the interior of cylinder 18. Both skiving and honing steps are provided so that the interior of the cylinder has slight crosshatching which facilitates oil distribution when the cylinder is put into use. All of the necessary operations are provided in a single machine system.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. Apparatus for finishing the cylindrical interior of a workpiece comprising:
   means for mounting the workpiece to allow access to the cylindrical interior thereof from each end;
   skiving means including a skiving tool and means for advancing the skiving tool into and through the cylindrical interior of the workpiece from one end thereof to machine said cylindrical interior;
   means for introducing cutting oil into the cylindrical interior of the workpiece to entrain the chips resulting from operation of the skiving means and flush said chips out through the second, opposite end of the workpiece;
   means for deflecting the cutting oil and entrained chips at the second end of the workpiece into a collector during operation of the skiving means, said deflecting means being moveable to expose the second end of the workpiece when operation of the skiving means is completed; and
   finishing means including a finishing tool and means for advancing the finishing tool into and through the cylindrical interior of the workpiece from the second end thereof after movement of the deflecting means to expose the second end of the workpiece to remove imperfections in the cylindrical interior of the workpiece resulting from use of the skiving tool.

2. The apparatus of claim 1 wherein the mounting means includes a headstock supporting the first end of the workpiece and a tailstock supporting the second of the workpiece, said headstock and said tail stock having cylindrical openings providing access to the cylindrical interior of the workpiece.

3. Apparatus for finishing the cylindrical interior of a workpiece comprising:
   a headstock adapted to support one end of the workpiece and allow access to the cylindrical interior of the workpiece from said one end;
   a tailstock adapted to support the second, opposite end of the workpiece and allow access to the cylindrical interior thereof from said second end;
   skiving means including a skiving tool and means for advancing the skiving tool into and through the cylindrical interior of the workpiece from said one end to machine said cylindrical interior;
   means for introducing cutting oil into the cylindrical interior of the workpiece to entrain the chips resulting from the skiving means and flush said chips out through the second, opposite end of the workpiece;
   deflection means including a deflection shield and means for pivotally mounting the deflection shield so that the shield can be moved into position over the second end of the workpiece during operation of the skiving means to deflect the cutting oil and entrained chips into a collector, and pivoted to a position exposing the second end of the workpiece when operation of the skiving means is completed;
   finishing means including a finishing tool and means for advancing the finishing tool into and through the cylindrical interior of the workpiece from the second end thereof after operation of the skiving means to remove imperfections in the cylindrical interior of the workpiece resulting from use of the skiving tool.

4. The apparatus of claim 2 or 3 wherein the finishing means includes a rest adapted to support the finishing tool outside the workpiece, and means for moving the rest and the finishing tool advancing means in unison so that the finishing tool is proximate the tailstock after movement of the deflecting means to expose the second end of the workpiece.

5. The apparatus of claim 4 wherein the finishing tool advancing means includes a drive coupled to the finishing tool, a chain which advances the drive to move the finishing tool through the cylindrical interior of the workpiece, and means separate from the chain to advance the drive and the finishing tool in unison to move the finishing tool from the rest into the tailstock.

6. Apparatus for finishing the cylindrical interior of a workpiece comprising:
   a headstock adapted to support one end of the workpiece and allow access to the cylindrical interior of the workpiece from said one end;
   a tailstock adapted to support the second, opposite end of the workpiece and allow access to the cylindrical interior thereof from said second end;
   skiving means including a skiving tool and means for advancing the skiving tool into and through the cylindrical interior of the workpiece from said one end to machine said cylindrical interior;
   means for introducing cutting oil into the cylindrical interior of the workpiece from the headstock to entrain the chips resulting from operation of the skiving means and flush said chips out through the second, opposite end of the workpiece;
   means for deflecting the cutting oil and entrained chips at the second end of the workpiece into a collector during operation of the skiving means, said deflecting means being moveable to expose the second end of the workpiece when the operation of the skiving means is completed;
   a finishing tool and a drive adapted to rotate the finishing tool;
   a rest adapted to support the finishing tool outside the workpiece during operation of the skiving means;
   means for moving the rest, the finishing tool and the drive in unison so that the finishing tool is advanced to a position proximate the tailstock after movement of the deflecting means to expose the second end of the workpiece;
   means for advancing the drive and the finishing tool in unison to move the finishing tool from the rest into the tailstock; and
   a chain which advances the drive to move the finishing tool through the cylindrical interior of the workpiece from the second end thereof to finish said interior subsequent to operation of the skiving means.

7. The apparatus of claim 1, 3 or 6 wherein the mounting means, the skiving means and the finishing means are mounted on a unitary machine bed.

8. The apparatus of claim 1 or 6 wherein the deflecting means comprises a deflector shield and means for pivotally mounting the deflector shield so that the deflector shield can be pivoted from a position overlying the second end of the workpiece to a position exposing the second end of the workpiece.

9. A method for finishing the cylindrical interior of a workpiece comprising the steps of:
   mounting the workpiece to allow access to the cylindrical interior thereof from each end;
   advancing a skiving tool into and through the cylindrical interior of the workpiece from one end thereof to machine said cylindrical interior;
   introducing cutting oil into the cylindrical interior of the workpiece to entrain the chips resulting from the skiving tool advancing step and flush said chips out through the second, opposite end of the workpiece;
   deflecting the cutting oil and entrained chips at the second end of the workpiece into a collector during said skiving tool advancing step;
   moving the deflecting means to expose the second end of the workpiece upon completion of the skiving tool advancing step; and
   advancing a finishing tool into and through the cylindrical interior of the workpiece from the second end thereof subsequent to said moving step to remove imperfections in the surface of the cylindrical interior of the workpiece formed during said skiving tool advancing step.

10. The method of claim 9 and additionally comprising the step of supporting the finishing tool on a hone rest except during said honing tool advancing step.

11. The method of claim 10 wherein said finishing tool advancing step includes advancing a rest and drive in unison until the finishing tool on the rest is immediately adjacent a tailstock supporting the second end of the workpiece, thereafter advancing the drive to position the finishing tool within the tailstock, and thereafter driving a chain connected to the drive to propel the finishing tool through the workpiece from the second end thereof.

12. A method for finishing the cylindrical interior of a workpiece comprising the steps of:
    mounting the workpiece to allow access to the cylindrical interior thereof from each end;
    advancing a skiving tool into and through the cylindrical interior of the workpiece from one end thereof to machine said cylindrical interior;
    introducing cutting oil into the cylindrical interior of the workpiece to entrain the chips resulting from the skiving tool advancing step and flush said chips out through the second, opposite end of the workpiece;
    interposing a deflection shield at the second end of the workpiece during the skiving tool advancing step to deflect the cutting oil and entrained chips into a collector;
    moving the deflection shield to expose the second end of the workpiece upon completion of the skiving tool advancing step;
    supporting a finishing tool on a rest during the skiving tool advancing step;
    advancing the rest and a drive in unison until the finishing tool on the rest is immediately adjacent a tailstock supporting the second end of the workpiece subsequent to said moving step;
    advancing the drive to move the finishing tool off the rest and position the finishing tool within the tailstock; and
    driving a chain connected to the drive to propel the finishing tool through the workpiece from the second end thereof to remove imperfections resulting from the skiving tool advancing step.

13. The apparatus of claim 1, 3 or 6 wherein the finishing tool comprises a honing tool.

14. The method of claims 9 or 12 wherein the finishing tool comprises a honing tool.

* * * * *